United States Patent [19]

Rees

[11] Patent Number: 5,213,300
[45] Date of Patent: May 25, 1993

[54] EXTRUDED AUTOMOTIVE SEAT TRACK

[75] Inventor: Richard W. A. Rees, Rochester Hills, Mich.

[73] Assignee: ITT Corporation, New York, N.Y.

[21] Appl. No.: 808,503

[22] Filed: Dec. 17, 1991

[51] Int. Cl.⁵ .......................................... F16M 13/00
[52] U.S. Cl. ................................... 248/429; 296/65.1
[58] Field of Search ............... 248/429, 430; 296/65.1; 384/34; 297/317, 346, 473, 468

[56] References Cited

U.S. PATENT DOCUMENTS

| | | |
|---|---|---|
| 2,037,366 | 10/1932 | Chapman . |
| 2,147,523 | 2/1939 | Chapman . |
| 3,832,019 | 8/1974 | Alessi . |
| 3,930,632 | 1/1976 | Shigeta ............................ 248/429 |
| 4,072,347 | 2/1978 | Boisset . |
| 4,168,051 | 9/1979 | Terada . |
| 4,395,011 | 7/1983 | Torta ............................... 297/322 X |
| 4,483,504 | 11/1984 | Duwelshoft . |
| 4,516,811 | 5/1985 | Akiyama ............................ 384/34 |
| 4,533,107 | 8/1985 | Okazaki ............................ 248/430 |
| 4,556,186 | 12/1985 | Langmesser .................. 296/65.1 X |
| 4,602,758 | 7/1986 | Mann . |
| 4,667,982 | 5/1987 | Volk . |
| 4,682,899 | 7/1987 | Andersson . |
| 4,720,073 | 1/1988 | Mann ................................. 248/430 |
| 4,776,551 | 10/1988 | Nishino . |
| 4,948,189 | 8/1990 | Terada . |
| 4,969,622 | 11/1990 | Munchow ..................... 296/65.1 X |
| 5,018,696 | 5/1991 | Siegrist . |

FOREIGN PATENT DOCUMENTS

| | | |
|---|---|---|
| 0394623 | 2/1990 | European Pat. Off. . |
| 0394892 | 4/1990 | European Pat. Off. . |
| 3235609 | 4/1983 | Fed. Rep. of Germany ...... 248/429 |
| 3915816 | 11/1990 | Fed. Rep. of Germany . |
| 3937818 | 5/1991 | Fed. Rep. of Germany . |

*Primary Examiner*—J. Franklin Foss
*Attorney, Agent, or Firm*—Robert P. Seitter; J. Gordon Lewis

[57] ABSTRACT

An automotive seating system including lightweight, high strength extrusions forming the track assemblies. The extrusions are formed with elongated abutment surfaces providing the sole reaction surfaces to resist separation of the track assemblies in the event of a crash. No separate reinforcements are needed.

19 Claims, 1 Drawing Sheet

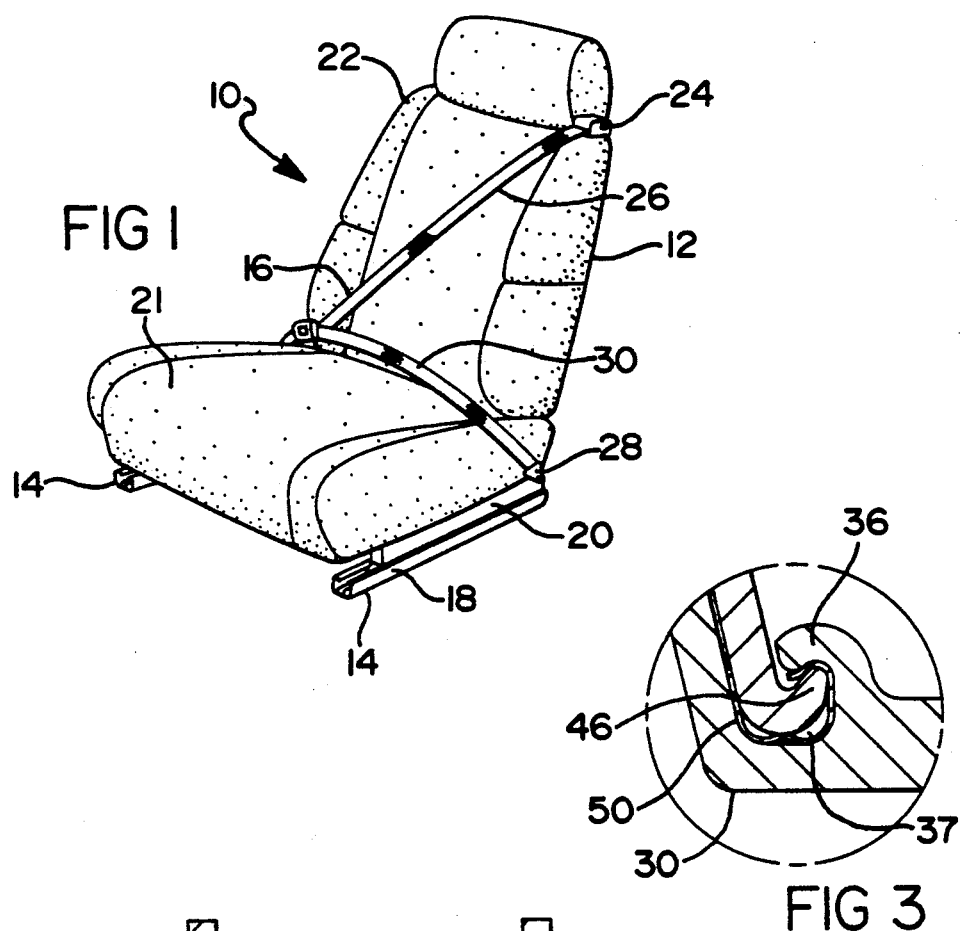
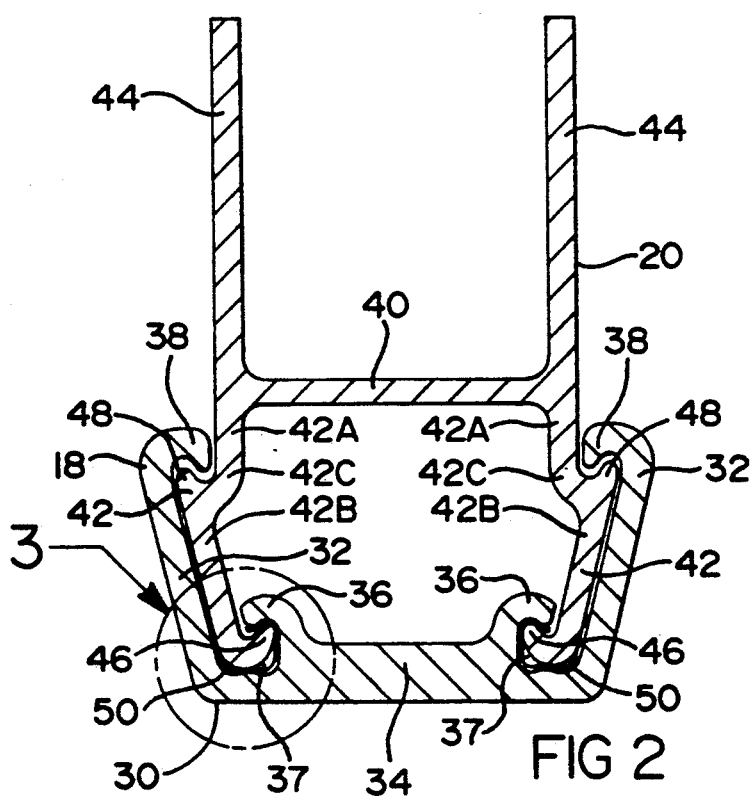

EXTRUDED AUTOMOTIVE SEAT TRACK

BACKGROUND OF THE INVENTION

This invention relates to automotive vehicle seat systems and, more particularly, to lightweight, high strength, economical seat track assemblies usable in such systems.

Automotive seating systems usually comprise a pair of seat track assemblies each including a lower track member mounted to the floor of the vehicle and an upper track member carrying a seat and slideably engaged with the lower track member for adjusting the position of the seat in the vehicle. The upper track members are coupled so as to move simultaneously one with the other. The system is also associated with seat or safety belt means designed to restrain a seat occupant in the event of a vehicle impact.

Automotive seating systems are considered part of the vehicle occupant's protection or safety systems. Accordingly, various requirements are imposed on such seating systems. They must have high strength and structural integrity so that the seat remains anchored to the vehicle in the event of a crash, i.e., the seat tracks should not separate from the vehicle, from each other or from the seat. Test requirements embodied in U.S. Federal Vehicle Safety Standards 208 and 210 require that the seating systems withstand loads of 1500 to 3000 pounds without failure. The outboard (adjacent the door) lower part of the seating system and each seat belt should withstand a load of 1500 pounds and the inboard (adjacent the centerline) lower part should withstand 3000 pounds. In addition, increased emphasis on fuel economy necessitates vehicle weight reduction. This, of course, makes it highly desirable to reduce the weight of the seating system, but mere weight reduction can adversely impact the strength the seating system.

Cost containment is still another requirement imposed on automotive vehicle seating systems and prior art attempts to meet all three requirements, high-strength—lightweight—low cost, have not been satisfactory. Some attempts have been made to substitute aluminum for steel in the design of the seat track assemblies. These designs required steel reinforcements to provide the required structural strength and these reinforcements add weight and cost to the systems.

Another desirable advantage for automotive seating systems is the integration of the seat or safety belt means so that the track assemblies, seat and seat belts are a self-contained unit. If the seat belts were integrated with the seat and track assemblies, adjustment of the seat by the occupant would not require readjustment of the seat belts. It would also facilitate the installation of the seat belts in convertible vehicles where no pillars are readily available. Usually the seat belt means are anchored to the vehicle body pillar and floor to reduce the loads imposed on the seat track assemblies during a crash. Attempts to integrate all of the seat belts with the seat and seat track assemblies aggravate the strength and weight considerations noted above.

SUMMARY OF THE INVENTION

It is an object of this invention to provide a lightweight, high strength automotive seat track assembly.

It is another object of this invention to provide such a seat track assembly that does not require heavy, high strength reinforcements.

It is still another object of this invention to provide such a seat track assembly made of aluminum extrusions.

Finally, it is an object of this invention to provide a lightweight, high strength automotive seating system wherein seat belt means are integrated with the seat and seat track assemblies to provide a self-contained module.

These and other objects are accomplished by providing a first elongated extrusion of lightweight material forming a lower track adapted to be mounted on the floor of an automotive vehicle and a second elongated extrusion of lightweight material forming an upper track adapted to carry an automotive seat. The upper track is slideably engaged with the lower track to permit adjustment of the seat. A plurality of abutment means are formed on each track for cooperating with each other at a plurality of locations along substantially the entire length of the track assembly to resist separation of the track members.

Preferably, there are four pairs of abutments extending along the length of the tracks to provide four elongated reaction zones to resist separation.

Use of the seat tracks with an automotive seat enables the seat belt means to be anchored to the tracks and the seat to provide an economical, high-strength, lightweight, integrated seating system.

DESCRIPTION OF THE DRAWING

For a better understanding of the invention reference is made to the following description of a preferred embodiment taken in conjunction with the drawings thereof in which:

FIG. 1 is a perspective view of an automotive seating system including an integrated seat, seat track assembly and seat belt means;

FIG. 2 is an enlarged cross-sectional view of the seat track assembly shown in FIG. 1; and FIG. 3 is an enlarged view of the circled portion of FIG. 2.

DETAILED DESCRIPTION OF A PREFERRED EMBODIMENT

In FIG. 1 there is illustrated an integrated automotive seating system 10 including an automotive seat 12, a pair of seat track assemblies 14, 14 and a seat belt system 16. The seat track assemblies 14, 14 will be described in greater detail hereinafter. At this point it is sufficient to know that each track assembly 14 includes a lower track member 18 associated with conventional fastener arrangements to secure it to the floor of the vehicle and also includes an upper track member 20 associated with conventional fastener arrangements to secure it to the bottom of the seat 12. The track members are elongated extrusions made of lightweight, high strength material, e.g., an aluminum alloy or a similar alloy having a yield strength of 50,000 psi or more, and are formed so that they are slideably engaged with each other for longitudinal movement of the upper track member and seat relative to the fixed lower track member. A conventional coupling arrangement is associated with each upper track member 20, 20 to assure that they move in unison. Accordingly, the position of the seat 12, is adjustable in the vehicle.

Although not shown in the drawing, each seat track assembly 14, 14 is also associated with locking means to lock the upper seat track member 20 in an adjusted position. If seat adjustment is accomplished manually, any conventional such locking means can be used. Preferably the seat track assemblies are associated with an electric motor and drive means to drive the upper seat track member 20 for adjusting its position. Any conventional motor and drive means can be utilized and, as usual in such arrangements, the locking means is part of the motor and drive means.

The automotive seat 12 can be any conventional type but preferably includes a lightweight, high strength frame. It also includes a bottom cushion 21 and backrest 22. Adjacent the top of the backrest 22 there could be an anchor member 24 which holds a shoulder belt 26 of the seat belt means 18. The track assemblies 14, 14 also each include an anchor member 28 and each anchor member 28 holds a portion of the lap belt 30. The anchor members 24, 28, 28 are conventional members as are the shoulder belt 26 and the lap belts 30, 30. All cooperate in a conventional manner to hold the occupant in the seat 12 in the event of a crash.

Referring to FIG. 2, the construction of the track assemblies 14 is shown in more detail. Each track assembly 14, 14 is essentially the same and, accordingly, only one need be shown and described.

As noted, the track members 18 and 20 are elongated extrusions made of a lightweight, high strength alloy such as aluminum. Suitable aluminum alloys include AA7129, 6061 or 6005. In making the extrusions they are formed in an elongated piece which is then cut to the appropriate length to fit in the vehicle and with the seat 12. This technique minimizes the various stamping and forming steps used to make conventional steel track members and facilitates the economical manufacture of the track assemblies 14.

The lower track member 18 is formed as a generally U-shaped member having a bottom or base portion 30 and a pair of upstanding legs 32, 32. The included angle between the base 30 and each leg 32 is preferably more than 90 degrees and in the embodiment disclosed herein is about 104 degrees. With such an angular relationship, the legs 32, 32 can help define a housing sufficiently wide to accommodate associated motors and/or drive means and at the same time allows use of a narrow base 30. This narrow base 30 is important in small cars with constricted floor space. The base 30 is formed with a centrally located thickened portion 34 extending throughout its length so that a space is formed between the side edges of the thickened portion 34 and the sidewalls 32, 32. The thickened portion 34 helps distribute stress associated with the floor mount fastener arrangements throughout the lower track member 18. Each side edge of the thickened portion 34 is formed with an elongated abutment. In this embodiment the abutment is a hook shaped portion 36 extending outwardly toward the adjacent sidewall 32 and slightly downwardly toward the base 30. Thus, the hook shaped abutments 36, the thinner regions of the base portion 30 the and sidewalls 32 define a pair of guideway 37, 37 extending along the length of the lower track member 18. As will be fully explained hereinafter, the hook shaped portions 36, 36 function as a pair of abutments that resist separation of the track members 18 and 20.

The free end of each sidewall 32 is also formed with an elongated abutment in the form of a hook shaped portion 38 extending inwardly toward the other sidewall and slightly downwardly toward the base portion 30. These hook shaped portions 38, 38 also function as a pair of abutments that resist separation of the track members 18 and 20.

The upper track member 20 includes a lower portion having a generally inverted U-shape and an integral upper portion having a generally U-shaped configuration. Thus, the upper track member 20 includes a web 40 with a pair of downwardly extending legs 42, 42 and a pair of upwardly extending legs 44, 44. The legs 42, 42 include short segments 42A, 42A extending from the web 40 generally parallel to each other. They also include angled segments 42B, 42B of a shape to rest within the walls 32, 32 of the lower track member 18. Having the walls 42B, 42B nest within the walls 32, 32 minimizes the possible interference of the movable track member 18 with the vehicle carpeting, objects placed under the seat or any rear seat passenger. An arcuate section 42C joins segment 42A to 42B. At their free ends, the angled segments 42B, 42B are formed with elongated abutments in the shape of hook shaped portions 46, 46 extending inwardly and upwardly and terminating adjacent the hook shaped abutments 36, 36. Adjacent the juncture of portions 42A and 42B there are formed an additional pair of abutments 48, 48 each in the form of an elongated rib that extends into the crook of adjacent hook shaped abutments 38. All abutments extend substantially throughout the length of the track members.

The upwardly extending parallel legs 44, 44 and the downwardly extending legs 42, 42 provide a housing containing electric motors and/or drive gears for that system.

In each guideway 38 there is a bearing member in the form of an elongated strip 50 made of low friction material such as stainless steel or a suitable polymer. Use of an elongated bearing is preferred inasmuch as it will allow the abutments 36 and 46 to cooperate over their length to provide elongated reaction surfaces extending over the length of the track assembly to resist separation of the track members 18 and 20. In this embodiment, as best shown in FIG. 3, the strip 50 is configured with a first leg fitting between legs 32 and 42A, a second leg fitting between base 30 and the lowermost surface portion of hook shaped abutment 46, a third leg fitting between the edge of thickened base portion 34 and the upwardly extending surface of the hook shaped abutment 46 and a fourth leg fitting around the tip of hook shaped abutment 46 and the crook 13 of the hook shaped abutment 36. The second leg portion of the strip 50 can be formed with a recess and bump to add resilience to the bearing arrangement. No bearing arrangement is utilized adjacent the hook abutments 38 and 48. Rather, there is a gap therebetween to minimize frictional drag.

The bearing 50 is located within the tracks so as to maintain minimal separation of the abutments 36 and 46 and to allow more widely spaced separation between the abutments 38 and 48. This allows for easier maintained tolerances between the upper abutments while reducing play between the track members. In one embodiment the gap between the free end surface of hook shaped abutment 46 and the crook of hook shaped abutment 36 would be about 0.50 millimeters (mm) if no bearing were included. The bearing takes up about 0.30 mm so that the actual gap in the fully assembled embodiment is about 0.20 mm. The gap between rib abutment 48 and the crook of hook abutment 38 is about 1.0 mm so that, in the event of a crash, the engagement of the lower pairs of abutments 36, 46 occurs before the engagement of the upper pairs of abutments 38, 48. Preferably, the hook shaped abutments 36, 36 are plastically deforming when the upper pairs of abutments 38, 48 finally emerge. The extent of the plastic deformation is such that the abutments 36, 36 have moved through about 0.80 mm when the abutments 48, 48 engage their adjacent abutments 38, 38.

In use, the track members 18 and 20 resist separation in the event of a crash by reacting the crash forces through four elongated regions extending along the length of the track assembly 14. These regions are formed by the engagement of the pair of hook shaped abutments 46 with the pair of hook shaped abutments 36. Because of the use of an elongated bearing means 50, as opposed to the more conventional use of a few roller arrangements, the crash load is distributed throughout the length of the track assemblies. In this embodiment, after engagement of the abutments 46 with abutments 36, the pair of rib abutments 48 will engage the pair of hook shaped abutments 38 to distribute additional crash loads over those elongated surfaces.

In addition, the arcuate segment 42C connecting leg portions 42A and 42B is somewhat thicker than the other portions of the track members. Because of the design, failure will cause the upper track member to shear through segment 42C and this thickened portion makes it somewhat easier to control the load at which the upper track member will shear and separate from the lower one.

While in the foregoing there has been described a preferred embodiment of the invention, it should be understood that the scope of the invention is described in the appended claims.

I claim:

1. A seat track assembly for automotive seats, said assembly comprising a first elongated extrusion of lightweight, high strength aluminum and a second elongated extrusion of lightweight, high strength aluminum slideably engaged with said first extrusion for longitudinal movement relative thereto, said first extrusion being formed with first and second pairs of abutment means along its length and said second extrusion being formed with third and fourth pairs of abutment means along its length so that each one of said abutment means of said first pair are adjacent and normally spaced from a different one of said abutment means of said third pair and so that each one of said abutment means of said second pair are adjacent and normally spaced from a different one of said abutment means of said fourth pair whereby said abutment means cooperate to provide four elongated reaction areas for resisting separation of said two extrusions.

2. A seat track assembly for automotive seats, said assembly comprising a first elongated extrusion of lightweight, high strength material and a second elongated extrusion of lightweight, high strength material slideably engaged with said first extrusion for longitudinal movement relative thereto, said first extrusion being formed with first and second pairs of abutment means along its length and said second extrusion being formed with third and fourth pairs of abutment means along its length so that each one of said abutment means of said first pair are adjacent a different one of said abutment means of said third pair and so that each one of said abutment means of said second pair are adjacent a different one of said abutment means of said fourth pair whereby said abutment means cooperate to provide four elongated reaction areas for resisting separation of said two extrusions, each one of the abutment means of said first pair being spaced from its adjacent abutment means of said third pair by a predetermined distance and each one of the abutment means of said second pair being spaced from its adjacent abutment means of said fourth pair by a distance larger than said predetermined distance so that upon movement of said extrusions said second and fourth pairs of abutment means engage and cooperate to resist separation of said first and second extrusions after said first and third pairs of abutment means engage.

3. A seat track assembly in accordance with claim 2 wherein said second and fourth pairs of abutment means engage and cooperate to resist disengagement of said first and third extrusions after the force causing separation of the extrusions causes said first pair of abutment means to deform plastically.

4. A seat track assembly in accordance with claim 2, wherein said lightweight material is aluminum.

5. A seat track assembly in accordance with claim 1, wherein the first and second pairs of abutment means are formed with grooves and wherein the third and fourth pair of abutment means are formed with fingers that engage in said grooves to resist disengagement of said extrusions.

6. A seat track assembly in accordance with claim 1, including bearing means located between said first and second extrusions to facilitate sliding movement thereof.

7. A seat track assembly in accordance with claim 6, wherein said bearing means includes an elongated strip of friction reducing material.

8. A seat track assembly for automotive seats, said assembly including a first elongated extrusion of lightweight material forming a lower track adapted to be mounted on the floor of an automotive vehicle and a second elongated extrusion of lightweight material forming an upper track adapted to carry an automotive seat, said upper track being slideably engaged with said lower track to permit adjustment of the seat, a plurality of abutment means formed on each track for reacting with each other at a plurality of locations each of which extends substantially along the entire length of said track assembly to resist separation of said tracks, and wherein one of said plurality of abutment means plastically deforms when resisting separation of said tracks and then another of said plurality of abutment means resists additional forces tending to cause separation of said tracks.

9. A seat track assembly in accordance with claim 8, wherein one of said first or second tracks includes means for anchoring an automotive seat belt thereto.

10. A seat track assembly in accordance with claim 8 wherein said abutment means provide the sole reaction surfaces for resisting separation of said tracks.

11. An automotive seat and seat track system for adjustably mounting the seat in an automotive vehicle, said seat track system comprising a pair of first elongated extrusions of lightweight, high strength aluminum spaced apart from each other for attachment to an automotive, and a pair of second elongated extrusions of lightweight, high strength aluminum spaced apart from each other and attached to the automotive seat, each one of said second extrusions being slideably assembled with a different one of said first extrusions for longitudinal movement of the second extrusions relative to the first extrusions whereby the seat can be adjustably arranged in a vehicle, and a plurality of abutment means formed integrally with the first and second extrusions and normally spaced apart, the abutment means engaging for resisting separation of the extrusions in the event of an automobile crash.

12. An automotive seat and seat track system in accordance with claim 11 wherein said abutment means provide the sole reaction surfaces in the seat track system for resisting separation of said first pair of extrusions from said second pair.

13. An automotive seat and seat track system in accordance with claim 11, further including seat belt means for securing a passenger in the seat, said seat belt means being secured to said seat and said seat track system for transmitting crash forces to said seat track system.

14. An automotive seat and seat track system in accordance with claim 11, wherein said abutment means provide the reaction surfaces for resisting separation of said first pair of extrusions from said second pair without any separate reinforcements.

15. An automotive seat track system for adjustably mounting the seat in an automotive vehicle, said seat track system comprising a pair of first elongated extrusions of lightweight, high strength material spaced apart from each other for attachment to an automotive vehicle, and a pair of second elongated extrusions of lightweight, high strength material spaced apart from each other and attached to the automotive seat, each one of said second extrusions being slideably assembled with a different one of said first extrusions for longitudinal movement of the second extrusions relative to the first extrusions whereby the seat can be adjustably arranged in a vehicle, and abutment means formed integrally with the first and second extrusions for resisting separation of the extrusions in the event of an automobile crash, said abutment means including a first set of abutments arranged to engage each other and plastically deform in the event of a crash causing the extrusion members to separate and a second set of abutments arranged to resist separation of said extrusion members after said first set of abutments starts to plastically deform.

16. An automotive seat and seat track system in accordance with claim 15, wherein said lightweight material is aluminum.

17. An automotive seat and seat track system in accordance with claim 15, wherein each of the first and second sets of abutments are formed with grooves and fingers that engage to resist disengagement of said extrusions.

18. An automotive seat and seat track system in accordance with claim 15, including bearing means located between said first and second extrusions to facilitate sliding movement thereof.

19. A seat track assembly in accordance with claim 18 wherein said bearing means includes an elongated strip of friction reducing material.

* * * * *